United States Patent [19]

Kolacek

[11] Patent Number: 5,251,758

[45] Date of Patent: Oct. 12, 1993

[54] FOOD CONTAINER WITH GRIPPABLE PORTION HAVING SENSE OF TOUCH INDICIA

[75] Inventor: Ivo Kolacek, Cicero, Ill.

[73] Assignee: Liblan & Co., Ltd., Cicero, Ill.

[21] Appl. No.: 958,478

[22] Filed: Oct. 8, 1992

Related U.S. Application Data

[63] Continuation of Ser. No. 729,568, Jul. 15, 1991, abandoned.

[51] Int. Cl.$^5$ .............................................. A45C 11/20
[52] U.S. Cl. ..................................... 206/542; 30/327; 206/459.5; 206/469; 206/471; 220/279; 229/1.5 C; 426/87; 426/115; 428/905
[58] Field of Search ............ 206/461, 469, 471, 459.5, 206/541, 542; 220/305, 279, 521, 642, 643, 651, 654, 658; 229/1.5 C; 383/206; 30/143, 147, 148, 324, 327; 428/36.6, 905; 426/87, 115

[56] References Cited

U.S. PATENT DOCUMENTS

| | | | |
|---|---|---|---|
| D. 169,580 | 5/1953 | Carvel | D7/654 |
| 1,288,617 | 12/1918 | Kupiszewski . | |
| 1,514,379 | 11/1924 | Fleischer . | |
| 2,433,926 | 1/1948 | Sayre . | |
| 2,469,343 | 5/1949 | Siewert . | |
| 2,584,379 | 2/1952 | Chmielewski . | |
| 2,816,589 | 12/1957 | Tupper | 220/305 |
| 2,954,916 | 10/1960 | Mela | 206/459 X |
| 2,978,142 | 4/1961 | Novick | 206/508 |
| 3,056,200 | 10/1962 | Williams . | |
| 3,112,824 | 12/1963 | Lemelson . | |
| 3,128,030 | 4/1964 | Davies | 206/557 X |
| 3,139,231 | 6/1964 | Hueschen | 206/459 |
| 3,149,824 | 9/1964 | Albano | 30/327 X |
| 3,208,625 | 9/1965 | Trabacchi . | |
| 3,226,825 | 1/1966 | Molinaro | 30/327 X |
| 3,362,571 | 1/1968 | Kuhne | 220/279 |
| 3,381,876 | 5/1968 | Biggins . | |
| 3,494,538 | 2/1970 | Matthews | 383/206 X |
| 3,624,787 | 11/1971 | Newman . | |
| 3,679,093 | 7/1972 | Chang . | |
| 3,722,779 | 3/1973 | Chang . | |
| 3,828,999 | 8/1974 | Humphrey . | |
| 3,908,887 | 9/1975 | Leto . | |
| 4,036,398 | 7/1977 | Hoogvelt et al. . | |
| 4,136,777 | 1/1979 | Watts, Jr. | 206/469 |
| 4,300,700 | 11/1981 | Chang . | |
| 4,339,033 | 7/1982 | Cillario | 229/1.5 C X |
| 4,415,084 | 11/1983 | Hauser et al. | 206/461 |
| 4,593,819 | 6/1986 | Will | 206/538 |
| 4,751,118 | 6/1988 | Wypart et al. | 428/36.6 |
| 4,877,609 | 10/1989 | Beck et al. | 30/124 X |
| 5,011,019 | 4/1991 | Satoh et al. | 428/905 X |

FOREIGN PATENT DOCUMENTS

| | | | |
|---|---|---|---|
| 1365481 | 5/1964 | France | 206/508 |
| 4102 | of 1901 | United Kingdom . | |

*Primary Examiner*—Bryon P. Gehman

[57] ABSTRACT

A combination food container and utensil comprises the container having a compartment for holding the food and an opening through which the compartment may be accessed, a lid for covering the opening, an elongated utensil having a handle portion, a food holding portion and a length less than the cross dimensions of the lid, a bubble arrangement engaging an upper surface of the lid and coacting therewith to form an enclosure for receiving and holding a utensil on the lid, and the combination including an indicator to enable a visually impaired person to determine the contents of either the enclosure or the compartment without requiring the use of the visual senses. Preferably, the indicator includes the bubble being formed of a pliable material, such as aluminum or synthetic plastic, which is moldable and allows a person to determine the type of utensil by feel. The indicator can also include information fields which are read by the sense of touch and contain indicia, such as braille.

18 Claims, 2 Drawing Sheets

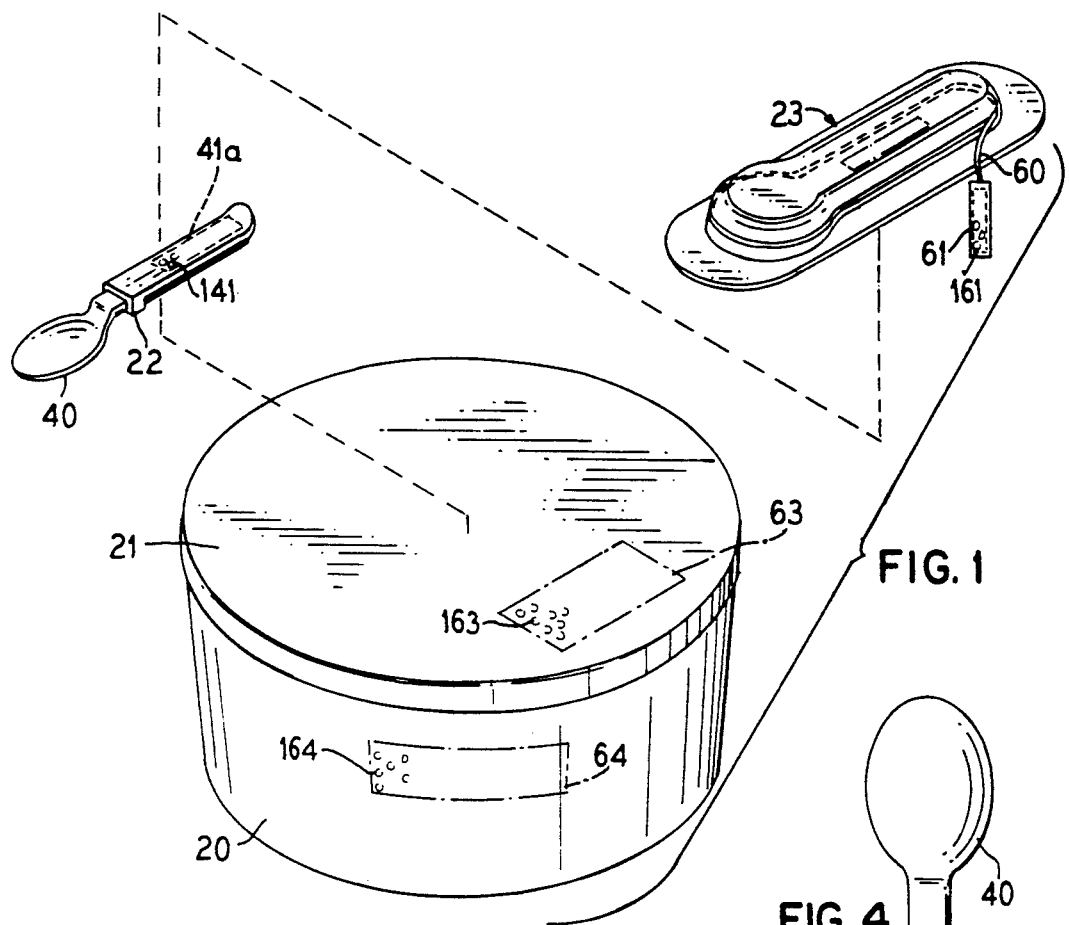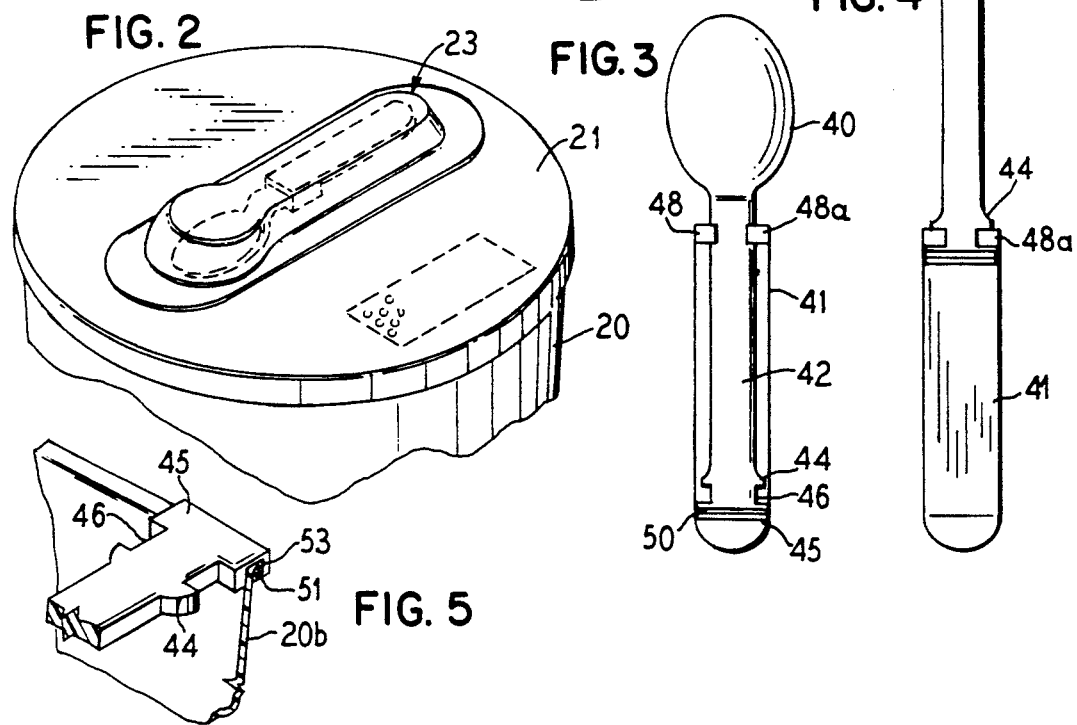

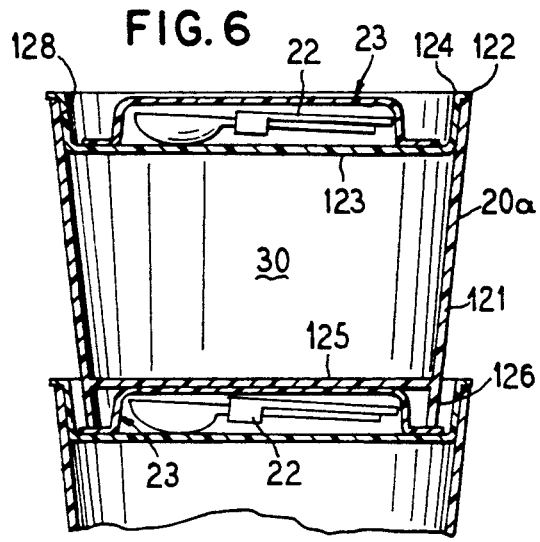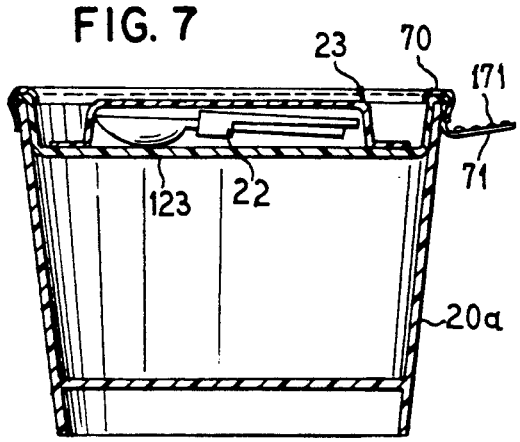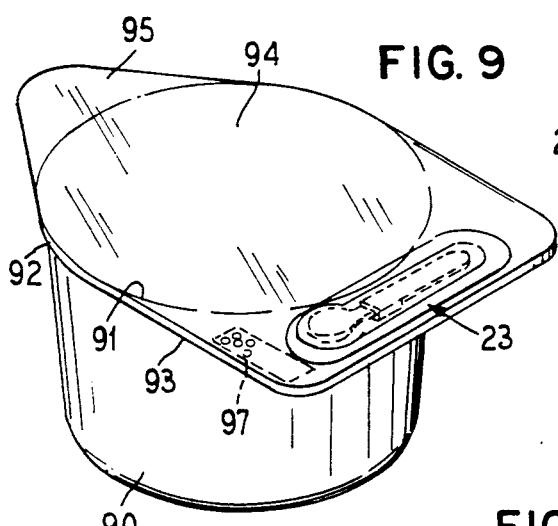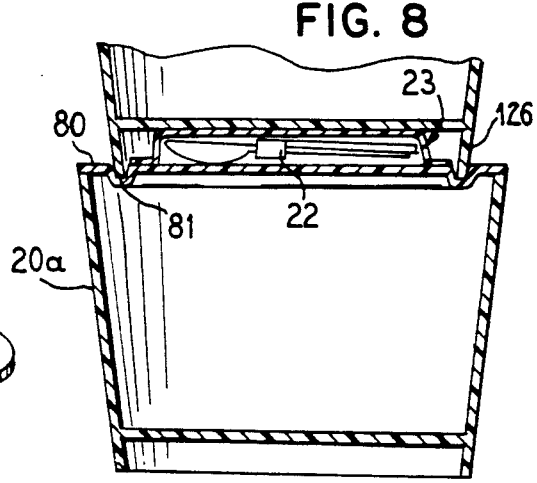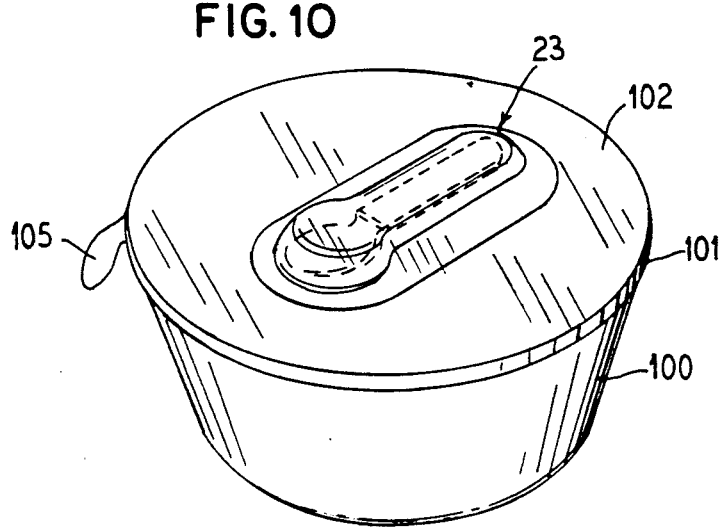

FOOD CONTAINER WITH GRIPPABLE PORTION HAVING SENSE OF TOUCH INDICIA

This is a continuation, of application Ser. No. 07/729,568, filed Jul. 15, 1991, now abandoned.

BACKGROUND OF THE INVENTION

The present invention is directed to a food container and utensil wherein the container has a compartment for holding the food and an opening through which the compartment may be accessed, a lid which covers the opening and has a generally flat upper surface, an elongated utensil is assembled with the container by a bubble arrangement which holds the utensil on the upper surface of the lid and the combination includes an indicating arrangement which will indicate to a sightless person or a person whose sight is impaired, either the type of utensil in the bubble or the type of food being held in the container. While this indicator can utilize the sense of smell, it preferably is either that the material for the bubble arrangement is moldable to enable feeling the utensil within the bubble or is a strip of braille information, either applied to the utensil, the bubble or the container.

When one packages foods for individual servings, such as for use with lunches, it is desirable that the container containing the food will also include a utensil for eating the contents of the container. Various arrangements for including a utensil or other item in a container are disclosed in U.S. Pat. Nos. 1,514,379; 2,433,926; 2,469,343; 2,584,379; 3,112,824; 3,208,625; 3,381,876; 3,624,787; 3,679,093; 3,722,779; 3,828,999; 3,908,887; 4,036,398; and 4,300,700. In many of these disclosures, a rather complicated container structure is provided simply to hold the utensil. For example, pockets or depressions are formed in the container wall or lid to accommodate the utensil. Others of the proposals leave the utensil exposed to the environment and, thus, to contamination. Still others of the proposals provide for placement and holding of the utensil on the interior wall of the container so that room which might otherwise be used for holding the container's content is used for holding the utensil. Thus, in this last group, the purchaser of the goods may not be aware that it comes with a utensil or that a utensil may occupy a majority of the volume of the container.

In some of the above Patents, due to mounting the utensil on the lid of the container, the utensil is separated or folded. Examples of such arrangements are disclosed in the above-mentioned U.S. Pat. Nos. 3,624,787 and 4,036,398. In addition, U.S. Pat. Nos. 1,288,617 and 3,056,200, along with British Patent Specification 4102 of 1901 all disclose utensils, such as a fork, which may be folded or moved from a contracted position to an expanded or extended position. Such a utensil, which can be expanded from a contracted position, will have a smaller dimension for purposes of storage and may be desirable for mounting on a container of a small size.

Of the above-mentioned items, a plastic bubble, which is transparent and, thus, allows a person to visually see the utensil, will not enable a person who has impaired sight or is blind to easily determine what utensil or object is being included with the container. Also, for the person whose sight is impaired, the difficulty of determining the contents of the container as to the food in addition to the utensil, may be a problem.

SUMMARY OF THE INVENTION

It is an object of the present invention to provide a combination of an eating utensil with a container in which the eating utensil is protected from contamination and will not adversely effect the volume of the contents that can be stored in the container.

Another object of the present invention is to provide an arrangement for combining an eating utensil with a container of food product which will enable a visually handicapped person to determine the type of utensil and/or the contents of the container by an indicating system that relies on other senses besides a person's vision.

To accomplish these goals, the present invention is directed to a combination of a food container and a utensil, said combination comprises a container having a compartment for holding food and an opening through which the compartment can be accessed; lid means for covering the opening, said lid means having a generally flat upper surface; an elongated utensil including a handle portion and a food holding portion and having a length being less than the cross dimensions of the lid means; bubble means or blisters engaging an upper surface of the lid means and coacting therewith to form an enclosure for receiving and holding the utensil on the lid means in a contamination-free manner, said bubble means including a thin sheet of pliable material and the combination including indicating means for a person who is visually impaired to determine the selected one of the contents of either the enclosure of the compartment by utilizing a sense other than a visual sense.

The thin sheet used for the bubble means is very pliable and can be either an aluminum foil or a thin plastic sheet, which enables a person to touch and mold the material around the utensil to the point to determine whether the utensil is a spoon, fork or knife. It is also possible that if the bubble is formed of a thin pliable plastic sheet, it can be impregnated with particles which would release a smell to enable the visually impaired person to determine the contents of the container by the aroma or smell given off. The indicator means can also include a strip of material containing indications, such as in braille, which indications can state the type of utensil or could state the type of utensil and/or state the contents of the container.

Another feature of the invention is to provide a tear-string for opening the blister or bubble means. Such a tear-string could include a tag containing indicia, such as in braille, to enable a person to obtain instructions for operating the tear-string by using the sense of touch.

Another feature of the invention is to provide a lid, which is held onto the container by a thermoplastic sealing foil or ring, which may have a pull portion for releasing the ring, which pull portion is provided with braille instructions for operation. The container lids can be formed by a flat piece of foil secured on the top of the container or a molded member which can be either flat or slightly recessed to enable stacking.

To enable mounting the utensil on a lid, it is preferably a collapsible utensil which is composed of two parts, with the first part being telescopically and slidably received in a second part and being provided with a pair of stops to enable locking the utensil in an extended position. In addition, one of the two parts is provided with a groove-like catch, which is designed to engage a turned-over rim of the container to enable positioning or fixing the utensil on its container during an interruption in eating.

Other advantages and features of the invention will be readily apparent from the following description of the preferred embodiments, the drawings and claims.

BRIEF DESCRIPTION OF THE DRAWINGS

FIG. 1 is an exploded perspective view illustrating the container with the lid, the utensil and the bubble in accordance with the present invention;

FIG. 2 is a partial top perspective view of the container of FIG. 1 with the bubble holding the utensil on the top of the container, in accordance with the present invention;

FIG. 3 is a bottom plan view of a utensil in a collapsed or contracted position;

FIG. 4 is a bottom plan view of the utensil of FIG. 3 in the expanded position;

FIG. 5 is a partial perspective view with portions broken away to illustrate a gripping groove of the utensil in accordance with the present invention;

FIG. 6 is a partial cross sectional view of a stack of containers in accordance with the present invention;

FIG. 7 is a cross sectional view of another type of container in accordance with the present invention;

FIG. 8 is a partial cross sectional view of a stack of containers showing yet another embodiment of the lid in accordance with the present invention;

FIG. 9 is a perspective view of the embodiment of the container in accordance with the present invention; and FIG. 10 is a perspective view of yet another embodiment of a lid for the combination container and utensil in accordance with the present invention.

DESCRIPTION OF THE PREFERRED EMBODIMENTS

The principles of the present invention are particularly useful when incorporated in a combination illustrated in FIGS. 1 and 2. The combination includes a container 20, which has a compartment with an opening closed by a lid 21 that has an upper surface which supports a utensil 22 held on the lid by a bubble means, generally indicated at 23.

As mentioned, the container 20, like a container such as 20a in FIG. 6, has a side wall 121 coacting with a bottom wall 125 to form a compartment 30 for receiving food. The container 20a is shaped like a conventional plastic cup, such as used to sell yogurt or cottage cheese, and the side wall 121 has an upper peripheral edge 122 that forms an opening 128 at the top to gain access to the contents. The lid 21 forms means for closing the opening 128.

Referring back to FIGS. 1-4, the utensil 22 is illustrated as an extendable spoon which has a collapsed condition illustrated in FIGS. 1, 2 and 3, but can be expanded to an open or extended position, as illustrated in FIG. 4. The utensil 22 is composed of two portions 40 and 41. The portion 40 has the food holding portion, which is illustrated as a spoon connected to a stem 42 which opposite the food holding portion 40, as illustrated in FIG. 3, has a pair of ramps or projections 44 coacting with an end member 45 to form catch portions, such as notches 46. The second portion 41 is a handle portion which, at one end, has two downwardly extending tabs or rails 48, 48 which have bent ends 48a to form a channel for receiving the stem 42. The two rails 48, 48, with their bent ends 48a, telescopically receive the stem and allow the handle portion to be moved relatively along the stem to increase the length of the utensil. As illustrated in FIG. 4, once the rails 48, 48 move over the lugs or projections 44, which have cam surfaces to spread the rails 48 to allow them to snap over the projections, the rails 48 become engaged in the notches 46 to lock the two portions of the utensil in the extended position. The end 45 may be provided with a groove 50, which has an overlapping lip 51 which, as illustrated in FIG. 5, engages on a rolled-over flange 53 on the rim of the opening of a container, such as 20b. During an interruption in eating the contents of the container, the groove 50 with the lip 51 enables hanging or positioning on the container in a fixed position so that it does not become separated therefrom.

The upper surface on the part 41 can support an information panel 41a (FIG. 1), which provides information in braille 141 for a person who is blind to instruct them on how to move the utensil 22 from the closed or contracted position, as illustrated in FIG. 1, to an extended position of FIG. 4. Since the handle portion telescopically receives the food portion and enables the utensil 22 to move between a retracted or a collapsed position to an expanded position, the utensil 22 can be easily mounted on the lid, since its length in the collapsed form, as illustrated in FIGS. 1 and 3, is less than the crosswise dimension of the lid 21.

The bubble means 23 cooperates with the upper surface of the lid 21 to form an enclosure or compartment which receives the utensil 22. With the material of the bubble means 23 secured to the upper surface, the utensil can be hermetically sealed and stored on the lid in a manner so that it will not become contaminated or become dirty. Preferably, the sheet of material forming the bubble means 23 is a thin pliable sheet, which can either be of an aluminum foil or of a thin sheet of plastic material, such as a polyvinyl chloride, which is commercially sold under the trademarks "DACOVIN 704", "RUCOBLEND VEO 300" and "SICRON 248". Another suitable plastic material is a polyvinylidene chloride, which is commercially sold under the tradename "SARAN". The SARAN material has the advantages of a low water permeability, and has already been approved for food wraps by the FDA and is not flammable. The foils or films, when used for the bubble, enables a person to mold the material around the utensil by touch to sense the shape and type of utensil. Thus, a person who is blind can, by feel, determine that the utensil is a spoon, fork or knife.

As illustrated in FIG. 1, it is contemplated that the bubble material will have a pull-string 60 to enable a person to easily open the bubble material to gain access to the utensil. This string is molded into the sheet of material and, preferably, can be provided with a tag, such as 61, which can be imprinted in braille 161 to provide instructions on its use.

As previously mentioned, an information field, such as 41a, can be provided on the utensil. It is also possible to provide the lid, such as 21, with an informational field 63 or to provide the container with an informational field 64. These fields can be strips of material which are stuck on the container and provide information in braille 163 or 164, respectively so that a person who is visually impaired can have access to certain information, such as the contents of the container.

The container 20 of FIGS. 1 and 2 is basically illustrated as a flat, can-like member. If the container is a container, such as 20a (FIGS. 6-8), it can have a lid 123, which is recessed and has a rim 124 for engaging an upper edge or lip 122 of the container 20a. Thus, the lid 123, when inserted, frictionally engages the inner surface of the side walls 121 to be frictionally held to close the opening to the container 20a. As illustrated, the container 20a has an annular skirt 126 so that the bottom 125 of the container is raised from the bottom edge of the skirt 126. This allows stacking of the container, as illustrated, and provides room or space to receive the bubble means 23 with the utensil 22.

In FIG. 7, the container 20a is provided with a thermoplastic sealing foil in the form of a ring 70, which can be shrunk down on the container to lock the lid 123 in place. Such a ring-shaped material can be formed of an element that has heat memory so that once the ring is placed on the container and heat is applied, it will shrink down to grasp and prevent removal of the lid without indicating that removal has occurred. To enable removing the ring, it is provided with a string or a pull 71, which, when pulled, will break the seal of the ring 70 to enable access to the lid 123. Again, this pull 71 can be provided with an information tag 171 that contains information in braille so that a blind person will have instructions on how to open the container.

In each of the embodiments of FIGS. 6 and 7, the lids 123 are basically recessed. In FIG. 8, a lid 80 is substantially a flat lid which is provided with an annular ring 81 to engage the lower edge of the skirt 126 of the container 20a. This enables another embodiment for stacking the containers. In each of these embodiments, it is noted that the bubble means 23 plus the utensil 22 is present.

In each of the previous embodiments, the lid 21 of FIG. 1 or 123 of FIGS. 6 and 7 or 80 of FIG. 8, were solid members that were secured on the end of the container. In FIG. 9, a container 90 has an opening 91 and has a peripheral lip 92 which has an enlarged ledge or protrusion 93 along one side. The lid means is a piece of foil 94 which adheres to the upper surfaces of the rim 92 and the ledge 93 and has a pull-tab portion 95. As in the previous embodiments, a bubble means 23 coacts with this lid material 94 to form a chamber for receiving the utensil, but is applied over the ledge 93 which provides underlying support. The ledge 93 also provides space for the indicating means 97, which can hold instructions for removing the lid 94, and/or described the contents of the container 90.

With regard to the material forming the lid 94, it can be an aluminum foil or a plastic foil, which is appropriate for forming a seal. The bubble can be of any material and, as mentioned above, can carry long-lasting fragrance substance to enable identifying the contents by the sense of smell.

In another embodiment illustrated in FIG. 10, a container 100 has an annular flange 101 surrounding the opening to the interior of the container. This flange has a lid 102 secured thereon to close the container. A bubble 23 coacts with an upper surface of the lid material 102 to form a chamber or enclosure for receiving a utensil which is held so that it is sealed from contact with dirt and other material. In this embodiment, a pull-tab 105 is provided, which is connected to a string arrangement arranged between the upper surface of the lip 101 and the lid material 102 so that pulling of the tab 105 causes a separation of the lid from the container. Again, information can be provided on the tab 105, which is readable by sense of touch so a person who has impaired sight will have instructions on how to open the container 100.

In both the embodiments of FIGS. 9 and 10, the lid material, as mentioned, can be formed of aluminum. Another preferred material would be a polyvinyl chloride, which is sold under the trade name of "SARAN". It is noted that this material has many advantages, since it has a low water permeability and has been approved by the FDA for food wraps and can be processed by a thermoplastic method.

The bubble 23, as mentioned above, is a pliable material which allows a person using the sense of touch to mold the bubble material around the utensil to determine the nature of the utensil. Also, it is of a thickness which would enable a person to read information provided on the handle of the utensil, such as a braille inscription 41a. Also, as mentioned above, braille can be imposed on portions of the container outside of the utensil for the purpose of enabling a person who has impaired sight to determine the type of utensil, to read instructions for opening the container and also to gain knowledge of the contents of the container.

If the bubble is a metal foil and a lid is of plastic material, than the bubble may feel colder than the lid when the container is removed from either the refrigerator or the freezer. Thus a temperature sensation can be used to locate and-or identify the bubble.

Although various minor modifications may be suggested by those versed in the art, it should be understood that I wish to embody within the scope of the patent granted hereon all such modifications as reasonably and properly come within the scope of my contribution to the art.

I claim:

1. A combination food container and utensil, said combination comprising a container having a compartment for holding food and an opening, which is formed by an upper periphery of a side wall of the container and through which the compartment can be accessed; lid means covering the opening, said lid means having a generally flat upper surface; an elongated utensil having a length less than the cross dimensions of said opening and having a handle portion and a food portion; bubble means engaging the upper surface of the lid means and coacting therewith to form an enclosure for receiving and holding the utensil on said lid means entirely within an area being defined by the upper periphery of the side wall, said combination including indicating means for a visually impaired person to determine the contents of both the container and enclosure without utilizing visual senses, the indicating means including the bubble means being formed of a thin pliable sheet of material, which enables determining the type of utensil by utilizing the sense of touch to feel the utensil through the bubble means, said bubble means including a tear-string molded in the material of the thin sheet forming the bubble means so that pulling said tear-string enables opening said bubble means, said tear-string having an end provided with an information surface readable by a sense of touch.

2. A combination according to claim 1, wherein the indicating means includes an information field disposed on one of the lids and container, said information field providing information about the contents through the sense of touch.

3. A combination according to claim 1, wherein the utensil has information provided thereon and the thin pliable material of the bubble means enables reading said information from said utensil by the sense of touch through the bubble means.

4. A combination according to claim 1, wherein the container has an annular outwardly extending, planar flange surrounding the opening, said lid means being a sheet of material secured on said container and being provided with means for removing said lid means to open the container.

5. A combination according to claim 4, wherein said means for removing said lid includes a tear-string arrangement disposed between the sheet of material forming the lid means and the flange of said container, said tear-string having a grasping point.

6. A combination according to claim 1, wherein said container has a portion of the side wall coacting with a bottom wall to form a skirt portion extending below the bottom wall, said lid means having a recessed portion for receiving a skirt portion of an identical container, said skirt portion having a sufficient dimension to provide space for receiving the bubble means and utensil when two containers are stacked.

7. A combination according to claim 6, wherein said recessed portion is an annular recess in a substantially flat lid means.

8. A combination according to claim 1, wherein the utensil is formed of two portions telescopically assembled together for sliding movement between a retracted position enabling receiving the utensil within said bubble means and an extended position for use when eating.

9. A combination according to claim 8, wherein a handle portion is provided at one end with a pair of outwardly extending tabs forming a channel for receiving a stem of a food receiving portion said stem of the food receiving portion, at an end opposite to the food receiving portion, having a pair of outwardly extending protuberances forming a notch for receiving the tabs of the handle portion to lock the handle portion and food receiving portion in the extended position.

10. A combination according to claim 8, wherein the container has an outwardly extending flange around the opening, said utensil being provided with a channel having a hook portion to enable hooking onto said flange, so that a person utilizing the utensil can fix the utensil on an edge of the container during an interruption in consuming the contents of said container.

11. A combination food container and utensil according to claim 1, wherein the lid means is a plastic material and the pliable sheet of the bubble means is a metal foil so that when the container is removed from a cold environment, the bubble means can be easily located and identified by a temperature sensation upon touching.

12. A combination food container and utensil, said combination comprising a container having a compartment for holding food and an opening through which the compartment may be accessed; lid means covering the opening, said lid means having a generally flat upper surface; an elongated utensil having a handle portion, a food holding portion and a length of said utensil being less than the cross dimensions of said lid means; bubble means engaging an upper surface of the lid means and coacting therewith to form an enclosure for receiving and holding the utensil on said lid means, said bubble means including means for opening the bubble means to gain access to the utensil contained in the enclosure, said means for opening including a tear-string provided in the material forming said bubble means, said tear-string being provided with a tab containing information which is readable by the sense of touch, and said combination including separate indicating means for a person to determine the contents of a selected one of the enclosure and compartment without utilizing the sense of vision.

13. A combination of a container and utensil, said combination comprising a container having a side wall surrounding a bottom wall to form a compartment for holding food and having an opening formed by an upper periphery of the side wall for gaining access to the compartment, said side wall extending below the bottom wall to form a skirt; lid means covering the opening and having a generally flat upper surface; sealing means for sealing the lid means onto the container, said sealing means including an annular ring engaging the upper periphery of the container and a portion of said lid, said ring being provided with a tear-strip containing information readable by a sense of touch; an elongated utensil having a handle portion, a food holding portion and a length being less than the cross dimensions of said opening; bubble means engaging an upper surface of the lid means and coacting therewith to form an enclosure for receiving and holding the utensil on said lid means entirely within an area defined by the upper periphery of the side wall; said lid means coacting with said bubble means to form means for receiving a skirt of another identical container to enable stacking of the two containers; and said combination including additional indicating means for enabling a visually impaired person to determine the contents of one of the enclosure and compartment while utilizing a sense other than sight.

14. A combination according to claim 13, wherein the lid means has an annular side wall terminating in an outwardly extending flange, said side wall of the lid means forming a recessed upper surface to form said means for receiving 15. A combination according to claim 13, wherein the means for receiving a skirt includes the lid means having an annular depression surrounding the enclosure.

16. A combination food container and utensil, said combination comprising a container having a compartment for holding food and an opening, which is formed by an upper periphery of a side wall of the container and through which the compartment can be accessed, said container having an annular outwardly extending, planar flange surrounding the opening; lid means covering the opening, said lid means being a sheet of material secured on said container and having a generally flat upper surface, said lid means being provided with means for removing said lid means to open the container, said means for removing said lid means including a tear-string arrangement disposed between the sheet of material forming the lid means and the flange of said container, said tear-string having a grasping point including an information field readable by touch; an elongated utensil having a length less than the cross dimensions of said opening and having a handle portion and a food portion; bubble means engaging the upper surface of the lid means and coacting therewith to form an enclosure for receiving and holding the utensil on said lid means entirely within an area being defined by the upper periphery of the side wall; and said combination including indicating means for a visually impaired person to determine the contents of both the container and enclosure without utilizing visual senses, the indicating means including the bubble means being formed of a thin pliable sheet of material, which enables determining the type of utensil by utilizing the sense of touch to feel the utensil through the bubble means.

17. A combination food container and utensil, said combination comprising a container having a compartment for holding food and an opening, which is formed by an upper periphery of a side wall of the container and through which the compartment can be accessed; lid means covering the opening, said lid means having a generally flat upper surface; sealing means for sealing the lid means on said container, said sealing means including a circular ring element having a tear-strip, said tear-strip being provided with an information field providing information by a sense of touch and said ring element surrounding the periphery of the lid means and engaging an upper surface of the container; an elongate utensil having a length less than the cross dimensions of said opening and having a handle portion and a food portion; bubble means engaging the upper surface of the lid means and coacting therewith to form an enclosure for receiving and holding the utensil on said lid means entirely within an area being defined by the upper periphery of the side wall; and said combination including indicating means for a visually impaired person to determine the contents of both the container and enclosure without utilizing visual senses, the indicating means including the bubble means being formed of a thin pliable sheet of material, which enables determining the type of utensil by utilizing the sense of touch to feel the utensil through the bubble means.

18. A combination according to claim 17, wherein said container has a portion of the side wall coacting with a bottom wall to form a skirt portion extending below the bottom wall, said lid means having a recessed portion for receiving a skirt portion of an identical container, said skirt portion having a sufficient dimension to provide space for receiving the bubble means and utensil when two containers are stacked.

* * * * *